(12) United States Patent
Kurumisawa

(10) Patent No.: US 7,576,744 B2
(45) Date of Patent: Aug. 18, 2009

(54) AUTOMATIC IMAGE CORRECTION CIRCUIT

(75) Inventor: Takashi Kurumisawa, Shinjin (JP)

(73) Assignee: Seiko Epson Corporation (JP)

( * ) Notice: Subject to any disclaimer, the term of this patent is extended or adjusted under 35 U.S.C. 154(b) by 646 days.

(21) Appl. No.: 11/155,673

(22) Filed: Jun. 20, 2005

(65) Prior Publication Data

US 2005/0286061 A1 Dec. 29, 2005

(30) Foreign Application Priority Data

Jun. 28, 2004 (JP) ............... 2004-189642

(51) Int. Cl.
- *G06T 1/00* (2006.01)
- *G09G 5/36* (2006.01)
- *G09G 5/00* (2006.01)
- *H04N 9/64* (2006.01)
- *G06K 9/00* (2006.01)
- *G06K 9/40* (2006.01)

(52) U.S. Cl. ............... 345/501; 345/211; 345/559; 382/167; 382/274; 348/242

(58) Field of Classification Search ............... 345/501, 345/559, 211–213; 348/242, E9.042, E9.054, 348/42; 382/167, 274–275
See application file for complete search history.

(56) References Cited

U.S. PATENT DOCUMENTS

2002/0145601 A1* 10/2002 Mino et al. ............... 345/211
2004/0207730 A1* 10/2004 Imai et al. ............... 348/207.1

FOREIGN PATENT DOCUMENTS

| CN | 1188956 | 7/1998 |
|---|---|---|
| CN | 1358023 | 7/2002 |
| JP | 2000-184006 A1 | 6/2000 |
| JP | 2003-348442 | 12/2003 |
| JP | 2004-274641 | 12/2003 |

* cited by examiner

Primary Examiner—Xiao M Wu
Assistant Examiner—Tize Ma
(74) Attorney, Agent, or Firm—Lowe Hauptman Ham & Berner, LLP

(57) ABSTRACT

An automatic image correction circuit automatically performs image correction on obtained image data. The automatic image correction circuit includes the following elements. A storage unit stores setting values used for the image correction. A reading portion reads the setting values stored in the storage unit every time the image correction is performed on one frame of the image data. A writing portion writes new setting values into the storage unit at a timing different from a timing at which the reading portion reads the new setting values.

7 Claims, 9 Drawing Sheets

FIG. 5

| | | |
|---|---|---|
| AUTOMATIC IMAGE CORRECTION MODE | 4 BITS M0, M1, M2, M3<br>M0 0: SATURATION CORRECTION ON<br>    1: SATURATION CORRECTION OFF<br>M1 0: CONTRAST CORRECTION ON<br>    1: CONTRACT CORRECTION OFF<br>M2 0: GAMMA CORRECTION ON<br>    1: GAMMA CORRECTION OFF<br>M3 0: LEVEL CORRECTION ON<br>    1: LEVEL CORRECTION OFF | |
| AUTOMATIC IMAGE CORRECTION AREA SETTING | AREA START COLUMN | 9 BITS |
| | AREA START PAGE | 9 BITS |
| | AREA SIZE | 4 BITS |
| AUTOMATIC IMAGE CORRECTION STATISTICAL-VALUE CALCULATING-VALUE SETTING | SHADOW/HIGHLIGHT THRESHOLD | 6 BITS |
| | STANDARD DEVIATION CALCULATION | 10 BITS |
| CONTRAST CORRECTION SETTING | INDEX 0 | 8 BITS |
| | INDEX 1 | 8 BITS |
| | INDEX 2 | 8 BITS |
| | INDEX 3 | 8 BITS |
| | ... | |
| | CORRECTION AMOUNT 0 | 4 BITS |
| | CORRECTION AMOUNT 1 | 4 BITS |
| | CORRECTION AMOUNT 2 | 4 BITS |
| | CORRECTION AMOUNT 3 | 4 BITS |
| SATURATION CORRECTION SETTING | THRESHOLD | 8 BITS |
| | CORRECTION COEFFICIENT | 8 BITS |
| | CORRECTION AMOUNT LIMIT | 8 BITS |
| GAMMA CORRECTION SETTING | THRESHOLD | 8 BITS |
| | CORRECTION COEFFICIENT | 6 BITS |
| | CORRECTION AMOUNT LIMIT | 6 BITS |
| SCENE DETECTION SETTING | LEVEL SETTING 0 | 8 BITS |
| | LEVEL SETTING 1 | 8 BITS |
| | LEVEL SETTING 2 | 8 BITS |
| | LEVEL SETTING 3 | 8 BITS |
| | LOAD COEFFICIENT 0 | 8 BITS |
| | LOAD COEFFICIENT 1 | 8 BITS |
| | LOAD COEFFICIENT 2 | 8 BITS |
| | LOAD COEFFICIENT 3 | 8 BITS |

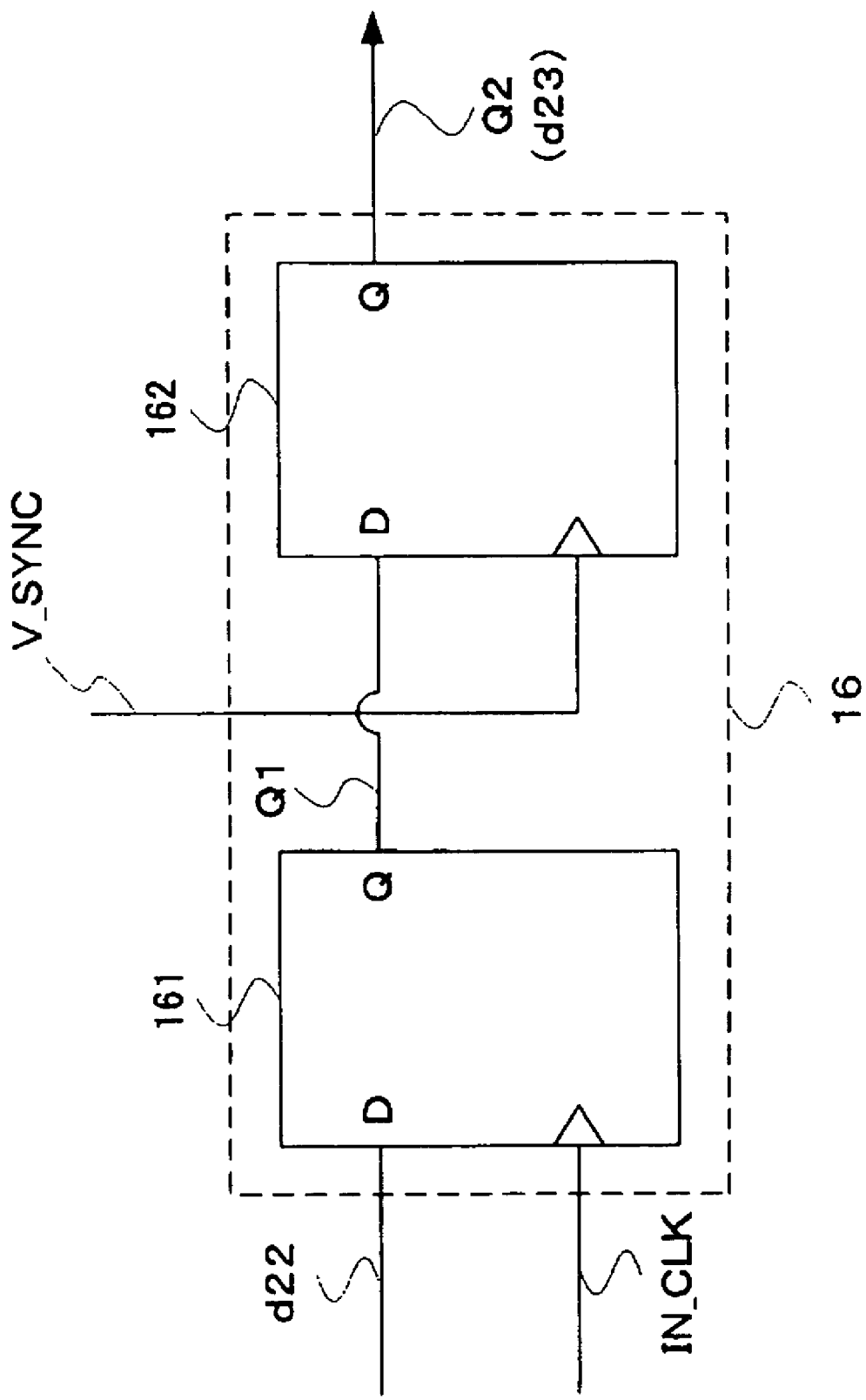

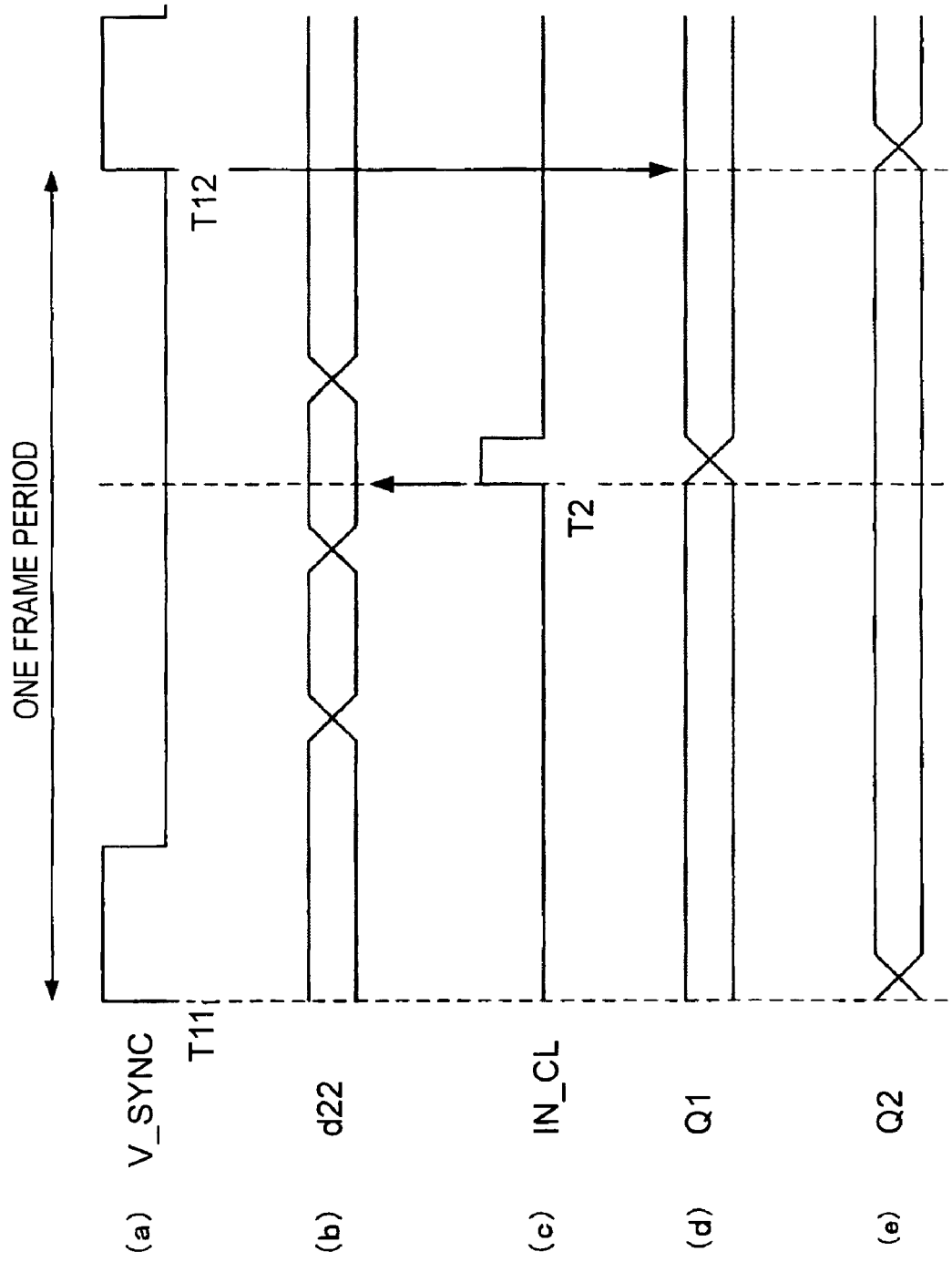

AUTOMATIC IMAGE CORRECTION CIRCUIT

RELATED APPLICATION

The present application is based on, and claims priority from, Japanese Application Number 2004-189642, filed Jun. 28, 2004, the disclosure of which is hereby incorporated by reference herein in its entirety.

BACKGROUND OF THE INVENTION

1. Technical Field

The present invention relates to automatic image correction circuits for performing automatic image correction.

2. Related Art

Automatic image correction circuits for automatically correcting input image data are known. In those circuits, statistical information used for automatic image correction is calculated from obtained image data, and suitable correction is conducted in accordance with the input image. As the image correction, level correction, gamma correction, contrast correction, etc. are performed to enhance images to be displayed.

In the register of an automatic image correction circuit, information concerning the intensity (level) and the range of image correction (hereinafter simply referred to as "setting values") is stored, and the setting values are read out from the register every time one frame of an image is corrected. Although the amount by which an input image is corrected (hereinafter simply referred to as the "correction amount") is changed in accordance with the input image, the setting values remain the same unless they are forcefully changed.

In a known automatic image correction circuit, to change setting values stored in the register, the operation of the correction circuit has to be interrupted. Accordingly, if, for example, the playback operation of moving pictures is interrupted for changing the setting values, it is difficult to compare pictures before changing the setting values with pictures after changing the setting values since the setting values have already been changed, which makes it difficult to set the intensity of image correction. If the setting values are changed in the middle of continuous moving pictures, an image including portions corrected with the previous setting values and portions corrected with new setting values is displayed. That is, changing the setting values may disturb the display of images.

SUMMARY

An advantage of the invention is that it provides an automatic image correction circuit for performing automatic image correction in which setting values can be changed without causing a disturbance in displayed images.

According to an aspect of the invention, there is provided an automatic image correction circuit that automatically performs image correction on obtained image data. The automatic image correction circuit includes the following elements. A storage that stores setting values used for the image correction. A reading portion reads the setting values stored in the storage unit every time the image correction is performed on one frame of the image data. A writing portion writes new setting values into the storage unit at a timing different from a timing at which the reading portion reads the new setting values.

The above-described automatic image correction circuit obtains image data, such as still images or moving pictures, and automatically corrects the image data. The automatic image correction circuit includes a storage unit that stores information concerning, for example, the intensity, thresholds, and range used for image correction. The setting values remain unchanged regardless of the type of input image unless they are forcefully changed. The setting values stored in the storage unit are read by the reading portion every time one frame of image data is corrected. The setting values can be changed to new setting values in response to, for example, a user. In this case, the writing portion writes the new setting values into the storage unit at a timing different from a timing at which the reading portion reads the new setting value. With this configuration, even if setting values are changed while image correction is being performed, the same frame is not corrected by different setting values, thereby preventing the occurrence of disturbance in images to be displayed. Thus, setting values can be changed without stopping playing back, for example, moving pictures.

It is preferable in the automatic image correction circuit that the storage unit includes a first register and a second register, the reading portion reads setting values stored in the second register; the writing portion includes a first writer and a second writer; the first writer writes the new setting values into the first register; and the second writer writes the setting values stored in the first register into the second register.

It is more preferable that the second writer writes the setting values stored in the first register into the second register when one frame of the image data is switched to another frame of the image data. Accordingly, the processing timing is different between the first writer and the second writer. Accordingly, when the setting values are changed over a plurality of frames, the setting values stored in the second register are not overwritten by new setting values even if the new setting values are stored in the first register. Thus, while the new setting values are stored in the first register, image correction is performed by the setting values (previous setting values) stored in the second register. Then, the new setting values are stored in the second register when the subsequent frame is corrected, and thus, this frame is corrected by the new setting values read from the second register. As discussed above, the automatic image correction circuit can perform image correction while maintaining the same setting values for one frame without being influenced by the timing at which setting values are changed, i.e., new setting values are input. The time lag from when setting values are changed to when the resulting images are displayed cannot be recognized by the human eye, and it appears that image are displayed in real time.

The above-described automatic image correction circuit can be suitably used in an electronic apparatus including an image display unit.

BRIEF DESCRIPTION OF THE DRAWINGS

The invention will be described with reference to the accompanying drawings, wherein like numbers reference like elements, and wherein:

FIG. 5 illustrates specific examples of setting values stored in a register;

FIG. 6 is a schematic diagram illustrating the configuration of a register according to an embodiment of the invention;

FIG. 7 is a timing chart illustrating signals input and output into and from the register when setting values are changed;

DESCRIPTION OF THE EMBODIMENTS

Preferred embodiments of the invention are described in detail with reference to the accompanying drawings.

Figure 1:
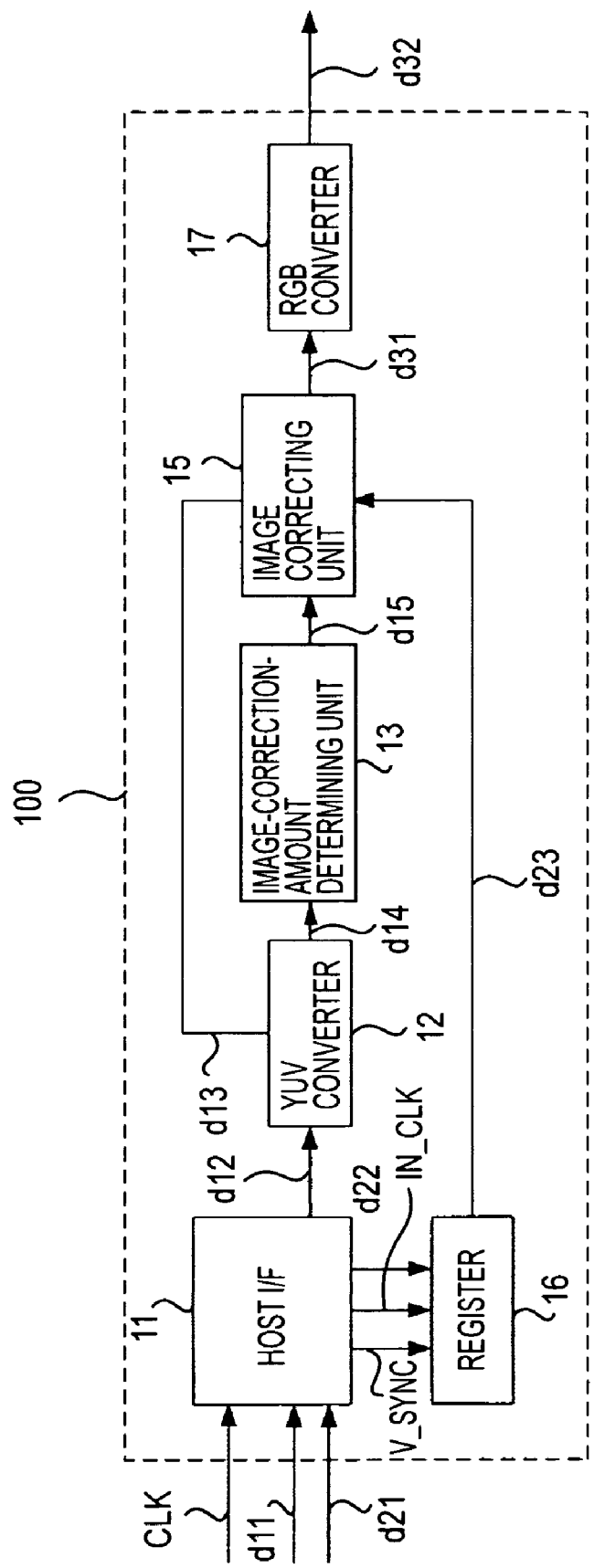
FIG. 1 is a block diagram illustrating the schematic configuration of an automatic image correction circuit according to an embodiment of the invention.

An automatic image correction circuit 100 constructed in accordance with an embodiment of the invention is discussed below with reference to FIG. 1.

The automatic image correction circuit 100 includes a host interface (I/F) 11, a YUV converter 12, an image-correction-amount determining unit 13, an image correcting unit 15, a register 16, and an RGB converter 17. The automatic image correction circuit 100 obtains image data, such as still images and moving pictures, and performs automatic image correction, mainly image enhancement, on each frame of the image data. The automatic image correction circuit 100 can be installed in an electronic device provided with an image display portion. For example, in a cellular telephone or a portable terminal provided with a display portion, such as a liquid crystal panel, the automatic image correction circuit 100 can be disposed in an image processor for supplying display image data to the display portion or a driver of the liquid crystal panel.

The host I/F 11 obtains from an external source a signal d11 corresponding to image data, a signal d21 corresponding to setting values used for performing image correction, and a clock signal CLK, which is a reference signal for performing processing in the automatic image correction circuit 100.

The image data d11 can be obtained from an image output device, such as a digital still camera, a video camera, or a scanner, a recording medium, such as a memory card, a flexible disk, a compact disc read only memory (CD-ROM), and a hard disk, the Internet, or a network server. It is now assumed that the image data d11 is input in the RGB format. The setting values d21 can be obtained by, for example, the input of a user, and includes information concerning the intensity, thresholds, and range of image correction. The setting values d21 remain the same regardless of the input image unless they are forcefully changed. The clock signal CLK includes a frame synchronizing signal and a clock signal used for writing the above-described setting values d21.

The host I/F 11 outputs image data d12 to the YUV converter 12, and also outputs setting values d22 to the register 16. The host I/F 11 further outputs a frame synchronizing signal V_SYNC, which is used for outputting the setting values from the register 16, to the register 16. The host I/F 11 also supplies a clock signal IN_CLK, which is used for inputting new setting values into the register 16, to the register 16. Details of processing for writing setting values into the register 16 by using the clock signal IN_CLK and the frame synchronizing signal V_SYNC are given below.

The YUV converter 12 converts the supplied RGB-format image data d12 into YUV-format data (YUV conversion). The YUV converter 12 then outputs signals d13 and d14 corresponding to the YUV-converted image data to the image correcting unit 15 and the image-correction-amount determining unit 13, respectively.

The image-correction-value determining unit 13 determines the correction amount corresponding to the intensity (level) of image correction for the YUV-format image data d14. More specifically, the image-correction-amount determining unit 13 determines the histograms and the average values of the luminance levels and the saturation levels of the image data d14 so as to determine the intensity of correction for the image data d14. A resulting correction amount d15 determined by the image-correction-amount determining unit 13 is output to the image correcting unit 15.

Figure 2:
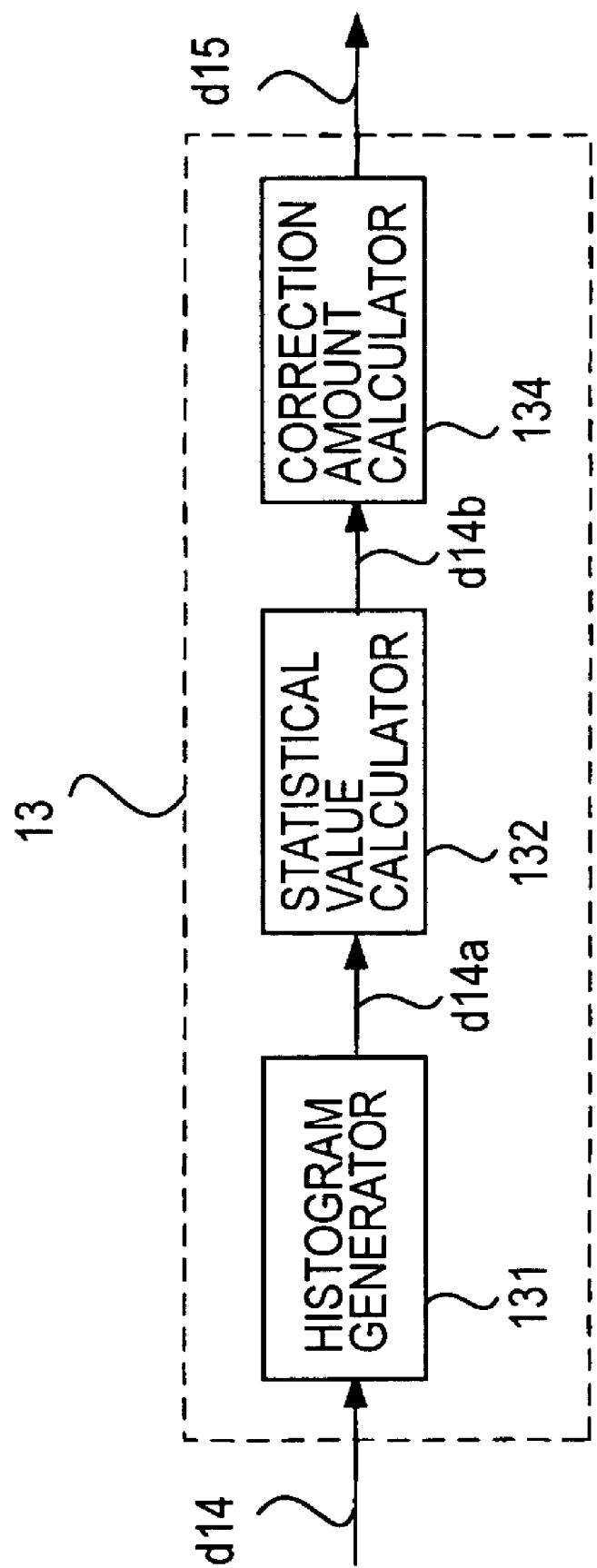
FIG. 2 is a block diagram illustrating the schematic configuration of an image-correction-amount determining unit.

The specific operation of the image-correction-amount determining unit 13 is discussed below with reference to FIG. 2. The image-correction-amount determining unit 13 includes a histogram generator 131, a statistical value calculator 132, and a correction amount calculator 134.

The histogram generator 131 generates histograms concerning the luminance levels and the saturation levels of the obtained image data d14, and also generates the total sums of the luminance levels and the saturation levels. A signal d14a corresponding to the histograms and the total sums is output to the statistical value calculator 132. The histogram generator 131 performs the above-described operation during one frame.

The statistical value calculator 132 calculates the statistical values for the luminance and the saturation of the image data based on the histograms and the total sums obtained as the signal d14a. More specifically, the statistical value calculator 132 calculates the maximum values, the minimum values, and the average values of the luminance levels and the saturation levels. The statistical value calculator 132 also calculates the standard deviation concerning the luminance levels. The statistical value calculator 132 outputs a signal d14b corresponding to the above statistical values to the correction amount calculator 134. The statistical value calculator 132 performs the above-described processing immediately after switching from one frame to another frame, i.e., after finishing the processing on one frame by the histogram generator 131.

The correction amount calculator 134 calculates the intensity (i.e., the correction amount) for the image data based on the obtained statistical values d14b. More specifically, the correction amount calculator 134 calculates the level correction coefficient, the gamma correction value, and the contrast correction value. A signal d15 corresponding to the calculated correction amount is output to the image correcting unit 15. The correction amount calculator 134 also detects scenes of the image data, simultaneously with calculating the correction amount.

Referring back to FIG. 1, the register 16 is discussed below. The register 16 stores setting values, which are reference values for determining the intensity, the range, etc., when performing image correction. Basically, the register 16 outputs stored setting values d23 to the image correcting unit 15 in synchronization with the frame synchronizing signal V_SYNC supplied from the host I/V 11. Details of the setting values stored in the register 16 are specifically described later.

Figure 3:
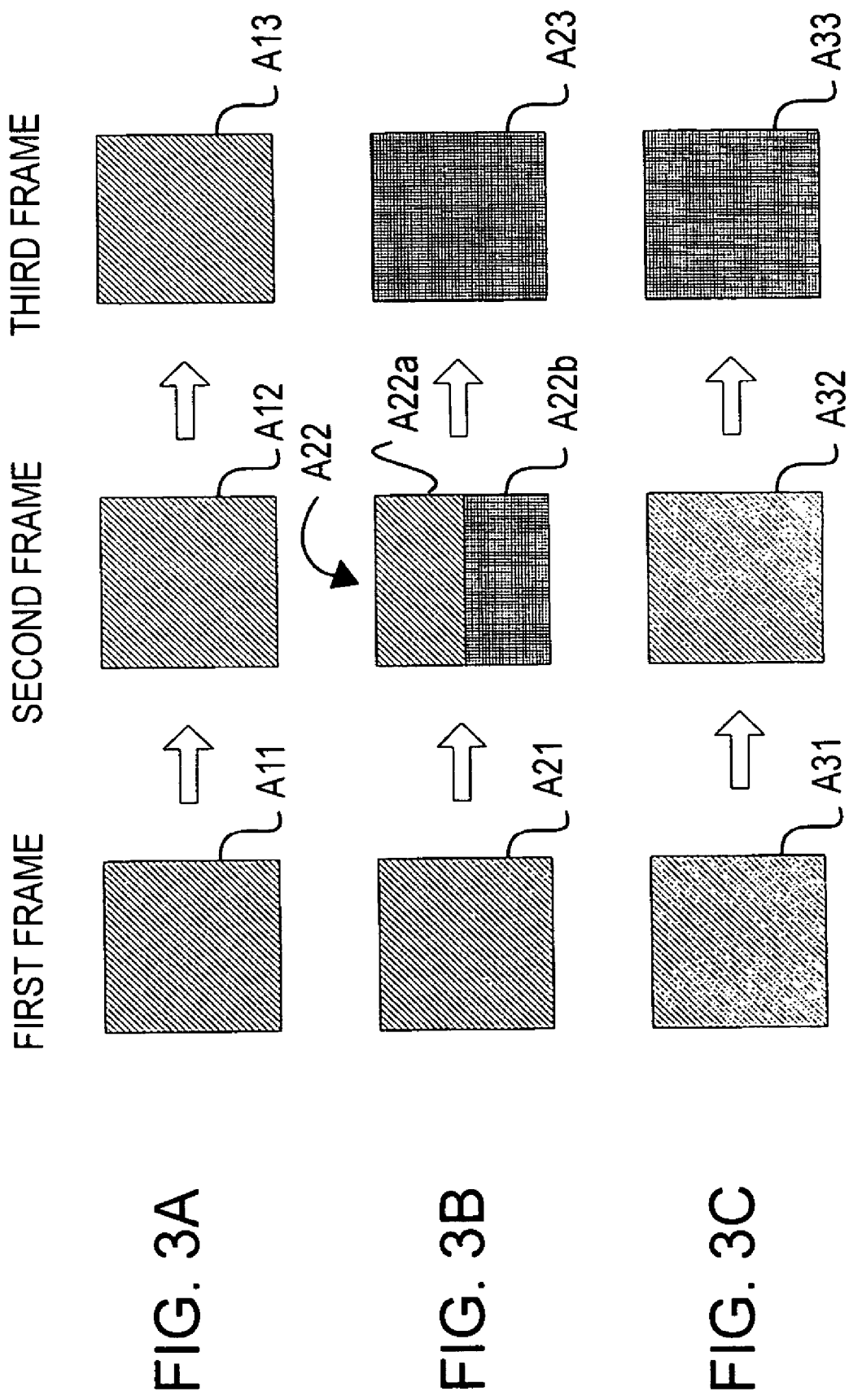
FIGS. 3A, 3B, and 3C illustrate images displayed when setting values are changed.

Drawbacks occurring by changing setting values stored in the register 16 are discussed below with reference to FIGS. 3A through 3C. FIGS. 3A through 3C schematically illustrate the use of setting values for correcting a plurality of continuous frame images forming a moving picture. In FIGS. 3A through 3C, the first frame image is shown at the left side, the second frame image is shown in the middle portion, and the third frame image is shown at the right side. The images shown in FIGS. 3A through 3C are corrected images, and they are not actual frame images, but the images in which the corrected areas are indicated by the same hatched portions.

FIG. 3A illustrates images which have been corrected by using only setting values x including a plurality of parameters. Images A11, A12, and A13 are indicated in the first, second, and third frames, respectively. Since the images A11, A12, and A13 have been corrected by using the same setting values x, no disturbance occurs in images to be displayed.

FIG. 3B illustrates images which have been corrected by using the setting values x and setting values y including a plurality of parameters, i.e., the setting values x are changed to the setting values y while processing the second frame image. In the images shown in FIG. 3B, the new setting values y are input into the register 16 in a general automatic image correction circuit. Images A21, A22, and A23 are displayed in the first, second, and third frames, respectively. In the first frame, the image A21 corrected by using the setting values x is displayed, and in the second frame, the image A22 including an image A22a corrected by the setting values x and an image A22b corrected by the setting values y is displayed. That is, a disturbance occurs in the second frame image. In the third frame, the image A23 corrected by using the setting values y is displayed.

By changing setting values while an image is being corrected, as discussed above, the resulting image to be displayed is disturbed since one frame image is corrected by using different setting values. In view of this point, in the automatic image correction circuit 100 constructed in accordance with this embodiment, the resister 16 is configured so that image correction can be performed without disturbing images to be displayed even if setting values are changed while moving pictures are being corrected.

The register 16 in this embodiment is discussed below. The register 16 includes a first register and a second register for storing setting values therein. The first register and the second register are connected to each other, and a signal output from the first register is input into the second register. When the setting values are changed, new setting values are input into the first register. The second register outputs the stored setting values to the image correcting unit 15. That is, the setting values stored in the second register are used for image correction. When the setting values are changed, the second register obtains the new setting values from the first register.

Different clock signals are input into the first register and the second register. Accordingly, the output timing of the first register is different from that of the second register, and similarly, the timing at which the first register stores an input signal is different from that at which the second register stores the input signal. Hereinafter, the clock signal supplied to the first register is referred to as a "first clock signal", and the clock signal supplied to the second register is referred to as a "second clock signal". As stated above, since the setting values stored in the second register are used for image correction, the second clock signal is the same as the frame synchronizing signal V_SYNC. The first clock signal and the second clock signal are independent of each other. In the first register and the second register, input information is stored in synchronization with the input clock signal, and also, the stored information is output.

The process for changing setting values in the first register and the second register is briefly discussed below. The changing of setting values over a plurality of frames is first discussed. When setting values are changed, new setting values are input into the first register. The first register stores the new setting values in synchronization with the first clock signal, and outputs them to the second register. Since the first clock signal and the second clock signal are different, i.e., since the first clock signal and the second clock signal are not synchronized with each other, the setting values stored in the second register are not overwritten by the new setting values simultaneously with storing the new setting values in the first register. In other words, even though new setting values are input into the second register, they are not stored in the second register since the second clock signal is not input into the second register while a frame is being corrected. Accordingly, the second register outputs the unchanged previous setting values to the image correcting unit 15. Thus, the frame is corrected by using only the previous setting values. When correcting the subsequent frame, the second clock signal is input into the second register. Then, the second register stores the new setting values input from the first register, and outputs them to the image correcting unit 15. Accordingly, the image data of this frame is corrected by the new setting values. When storing the new setting values in the second register, the same information as that stored in the first register is moved to the second register, which is so-called "mirroring".

When the first clock signal and the second clock signal are synchronized with each other, new setting values are simultaneously stored in the first register and the second register, and at the same time, the second register outputs the new setting values. In this case, since the second register outputs the new setting values when starting correcting the subsequent frame, the setting values are changed simultaneously with switching the frames. Accordingly, the frame is not corrected by different setting values.

As discussed above, in this embodiment, the register 16 is formed of two registers: one register obtains new setting values, and the other register outputs setting values for image correction. Different clock signals are supplied to the two registers. With this configuration, the output and changing of setting values for image correction can be suitably performed regardless of the timing at which setting values are input from, for example, a user. Accordingly, when changing setting values, the same frame is not corrected by different setting values.

FIG. 3C illustrates images displayed while changing setting values, i.e., the setting values x are changed to the setting values y while processing the second frame. Images A31, A32, and A33 are shown in the first, second, and third frames, respectively. In the first frame, the image A31 corrected by using only the setting values x is displayed. In the second frame, the image A32 corrected by only using the setting values x stored in the second register is displayed. The reason for this is as follows. Since clock signals input into the first register and the second register are different, although the first register stores and outputs the setting values y, the second register outputs the previous setting values x to the image correcting unit 15 without storing the new setting values y. In the third frame, the image A33 corrected by using only the setting values y is displayed. The reason for this is as follows. The second register stores the setting values y input from the first register in synchronization with the frame synchronizing signal V_SYNC corresponding to the third frame, and outputs the setting values y to the image correcting unit 15.

According to the above-described configuration of the register 16, even if setting values are changed over a plurality of frames, no disturbance occurs in images to be displayed. The time lag from when setting values are changed to when images are displayed cannot be recognized by the human eye, and it appears that the images are displayed in real time.

Referring back to FIG. 1, the processing performed by the image correcting unit 15 is discussed below. The setting values d23 output from the register 16, the correction amount d15 output from the image-correction-amount determining unit 13, and the image data d13 subjected to YUV conversion in the YUV converter 12 are supplied to the image correcting unit 15. The image correcting unit 15 performs image correction on the image data d13 based on the correction amount d15 and the setting values d23. More specifically, the image correcting unit 15 performs level correction, gamma correction, contrast correction, and saturation correction on the image data d13. Corrected image data d31 is then output to the RGB converter 17.

The RGB converter 17 converts the supplied YUV-format image data d31 into RGB-format data (i.e., RGB conversion). The RGB converter 17 then outputs RGB-converted image data d32 to an image display unit, for example, an LCD panel (not shown). The image display unit then displays the image data d32.

In the above-described automatic image correction circuit 100, the register 16 obtains setting values from the host I/F 11. However, the register 16 may obtain setting values from a source different from the host I/F 11. The same applies to the frame synchronizing signal V_SYNC and the clock signal IN_CLK. For example, the register 16 may obtain setting values and signals from the central processing unit (CPU) of an electronic device equipped with the automatic image correction circuit 100.

Figure 4:
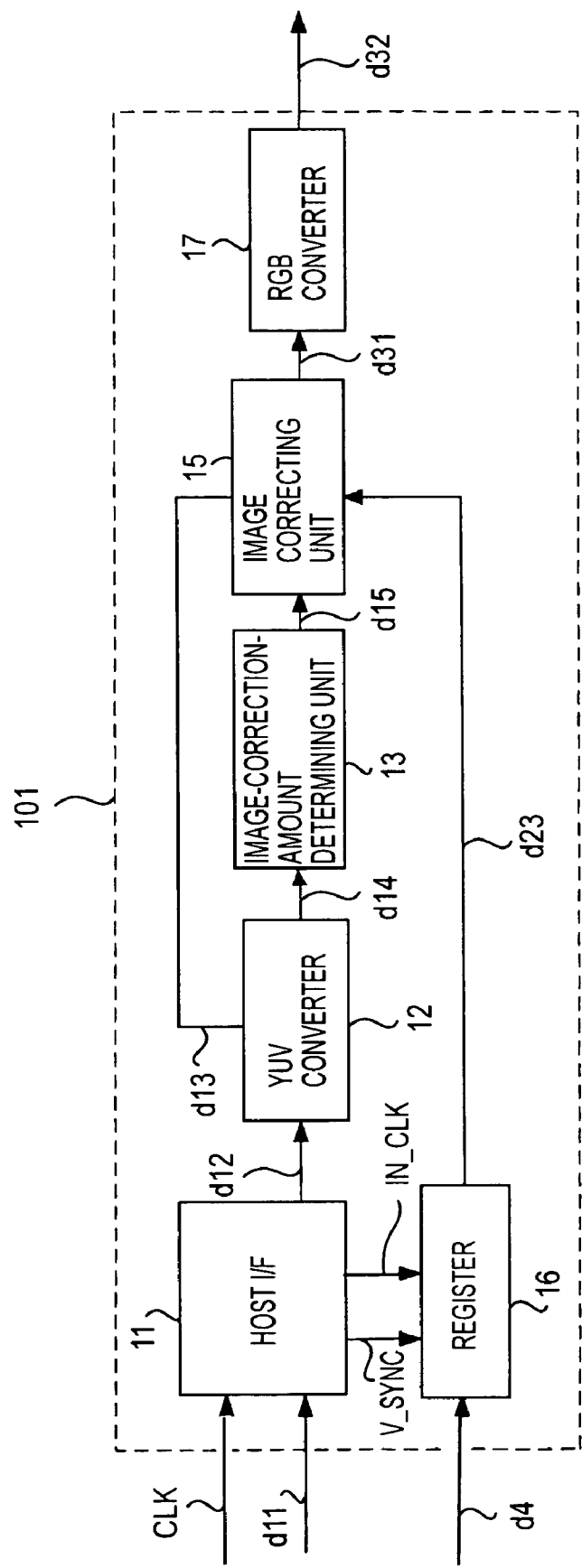
FIG. 4 is a block diagram illustrating the schematic configuration of au automatic image correction circuit according to a modified example of the invention.

FIG. 4 illustrates an automatic image correction circuit 101 of a modified example made to the image correction circuit 100. The automatic image correction circuit 101 is different from the automatic image correction circuit 100 only in that the register 16 uses a different source for obtaining setting values. That is, although the register 16 of the automatic image correction circuit 100 obtains the setting values d22 via the host I/F 11, the register 16 of the automatic image correction circuit 101 directly obtains setting values d4 from an external source by using a dedicated bus. In this modified example, setting values can be changed over a plurality of frames without disturbing images to be displayed. The register 16 of the automatic image correction circuit 101 may obtain the setting values d4 from the CPU of an electronic device equipped with the automatic image correction circuit 101.

Details of the register 16 are described below with reference to FIGS. 5 through 7.

Specific examples of the setting values stored in the register 16 are shown in FIG. 5. The register 16 stores values for an automatic image correction mode, automatic image correction area setting, automatic image correction statistical-value calculating-value setting, contrast correction setting, saturation correction setting, gamma correction setting, and scene detection setting.

The automatic image correction mode is four-bit information including M0, M1, M2, and M3, each being one-bit information. M0 is information determining whether saturation correction is to be performed. M1 is information determining whether contrast correction is to be performed. M2 is information determining whether gamma correction is to be performed. M3 is information determining whether level correction is to be performed. M0, M1, M2, and M3 information each indicate 0 or 1: 0 indicates that the corresponding correction is performed, and 1 indicates that the corresponding correction is not performed.

The automatic image correction area setting information includes 9-bit area start column information determining the position of an area at which automatic correction is performed, 9-bit area start page information determining the page on which automatic correction is started, and 4-bit area size information determining the size of the area on which automatic correction is conducted.

The automatic image correction statistical-value calculating-value setting information includes 6-bit shadow/highlight threshold information determining the thresholds of the shadow and the highlight of an image, and 10-bit standard deviation calculation information corresponding to the standard deviation used for calculating statistical values.

The contrast correction setting information includes index 0, index 1, index 2, index 3, and so on concerning the contrast index (CI) for performing contrast correction, each being 8-bit information. The contrast correction setting information also includes correction amount 0, correction amount 1, correction amount 2, and correction amount 3, each being 4-bit information indicating the correction amount for performing contrast correction.

The saturation correction setting information includes 8-bit threshold information determining the threshold of saturation correction, 8-bit correction coefficient information determining the intensity of saturation correction, and 6-bit correction amount limit information determining the upper limit of saturation correction.

The gamma correction setting information includes 8-bit threshold information determining the threshold of gamma correction, 6-bit correction coefficient information determining the intensity of gamma correction, and 6-bit correction amount limit information determining the upper limit of gamma correction.

The scene detection setting information includes level setting 0, level setting 1, level setting 2, and level setting 3, each being 8-bit information indicating the level of scene detection. The scene detection setting information also includes load coefficient 0, load coefficient 1, load coefficient 2, and load coefficient 3, each being 8-bit information concerning the load for performing scene detection.

The processing performed by the register 16 is described below with reference to FIGS. 6 and 7.

The register 16 includes registers 161 and 162. The signal d22 corresponding to setting values (including the setting values d4) and the clock signal IN_CLK are input into the register 161 from, for example, the host I/F 11. The register 161 outputs a signal Q1 to the register 162. The register 161 detects the rising edge of the clock signal IN_CLK and latches the input setting values d22 at the rising edge of the clock signal IN_CLK. In this case, the signal Q1 output from the register 161 is changed in accordance with the setting values d22 latched in the register 161.

The signal Q1 input from the register 161 and the frame synchronizing signal V_SYNC input from the host I/F 11 are supplied to the register 162. The register 162 outputs a signal Q2, which is the same as the above-described setting values d23, to the image correcting unit 15. The registers 162 detects the rising edge of the frame synchronizing signal V_SYNC, and latches the input signal Q1 at the rising edge of the frame synchronizing signal V_SYNC. In this case, the signal Q2 output from the register 162 is changed in accordance with the signal Q1 latched in the register 162.

In this manner, the register 161 serves as the first register, and the register 162 serves as the second register. The clock signal IN_CLK corresponds to the first clock signal, and the frame synchronizing signal V_SYNC corresponds to the second clock signal.

Signals input into and output from the registers 161 and 162 when changing setting values are specifically discussed with reference to the timing chart of FIG. 7. The frame synchronizing signal V_SYNC input into the register 162 is indicated in (a) of FIG. 7. The signal d22 input into the register 161 is indicated in (b) of FIG. 7. The clock signal IN_CLK input into the register 161 is indicated in (c) of FIG. 7. The signal Q1 output from the register 161 is indicated in (d) of FIG. 7. The signal Q2 output from the register 162 is indicated in (e) of FIG. 7. The cycle of the frame synchronizing signal V_SYNC (i.e., one frame period) is associated with the interval between time T11 and time T12 when the frame synchronizing signal V_SYNC rises. It is now assumed that setting values are changed during the frame period, and thus, the clock signal IN_CLK rises at time T2 between time T11 and time T12.

The new setting values d22 are input into the register 161, as indicated in (b) of FIG. 7. The register 161 reads the input setting values d22 at the rising edge of the clock signal IN_CLK, and more specifically, at time T2. Accordingly, the signal Q1 output from the register 161 is changed at time T2, as indicated in (d) of FIG. 7.

The register 162 reads the signal Q1 input from the register 161 at the rising edge of the frame synchronizing signal V_SYNC, and more specifically, at time T12. Accordingly, the signal Q2 output from the register 162 is changed at time T12, as indicated in (e) of FIG. 7. In other words, since the frame synchronizing signal V_SYNC does not rise until time T12 in the register 162, the signal Q2 output from the register 162 remains unchanged even if the signal Q1 input into the register 162 is changed during one frame period. Accordingly, the signal Q2 output from the register 162 is not changed in the middle of the frame, and thus, the frame is corrected by the same setting values.

As described above, when changing setting values, the current frame is corrected by using only the previous setting values, and the subsequent frame is corrected by using new setting values. That is, even when setting values are changed in the middle of a frame, the frame is not corrected by using different setting values. Thus, no disturbance occurs in images to be displayed even if setting values are changed over a plurality of frames.

An example of an electronic apparatus to which the automatic image correction circuit 100 or 101 in accordance with this embodiment of the invention is applied is described below with reference to the schematic diagram of FIG. 8.

Figure 8:
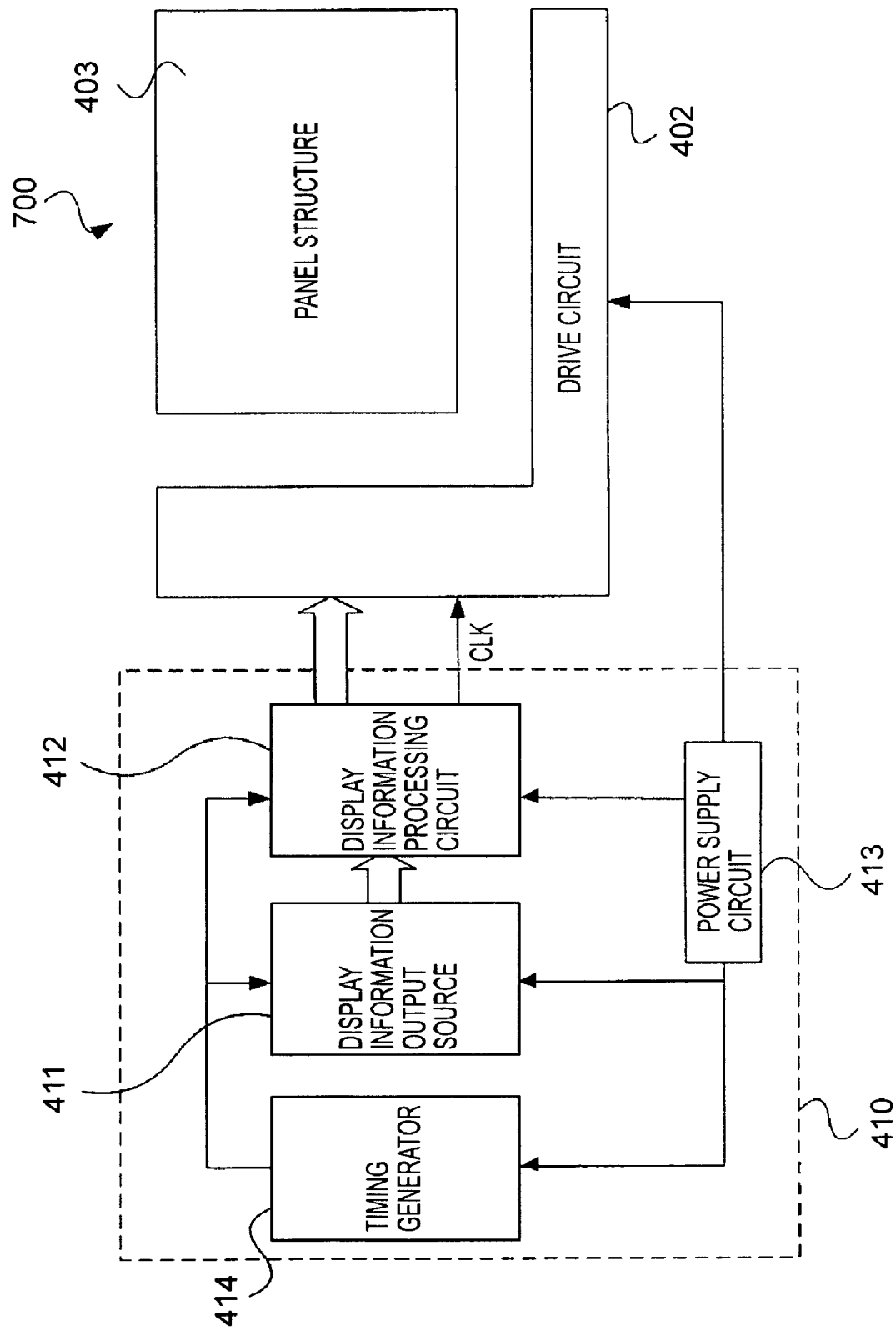
FIG. 8 is a circuit block diagram illustrating an electronic apparatus to which the automatic image correction circuit according to an embodiment of the invention is applied.

The electronic apparatus shown in FIG. 8 includes a liquid crystal display device 700, which serves as a display unit, and a controller 410 for controlling the liquid crystal display device 700. The liquid crystal display device 700 includes a panel structure 403 and a drive circuit 402 formed of, for example, a semiconductor integrated circuit (IC). The automatic image correction circuit 100 or 101 of the above-described embodiment of the invention can be disposed in the drive circuit 402. The controller 410 includes a display information output source 411, a display information processing circuit 412, a power supply circuit 413, and a timing generator 414.

The display information output source 411 includes a memory, such as a ROM or a random access memory (RAM), a storage unit, such as a magnetic recording disk or an optical recording disc, and a tuning circuit for tuning and outputting a digital image signal. The display information output source 411 supplies display information to the display information processing circuit 412 as an image signal of a predetermined format based on various clock signals generated by the timing generator 414.

The display information processing circuit 412 includes various known circuits, such as a serial-to-parallel conversion circuit, an amplifying/inverting circuit, a rotation circuit, a gamma correction circuit, and a clamping circuit. The display information processing circuit 412 processes input display information and supplies the resulting image information to the drive circuit 402 together with the clock signal CLK. The drive circuit 402 includes a scanning-line drive circuit, a data-line drive circuit, and a detection circuit. The power supply circuit 413 supplies predetermined voltages to the above-described elements.

Specific examples of the above-described electronic apparatus are discussed below with reference to FIGS. 9A and 9B.

Figure 9A:
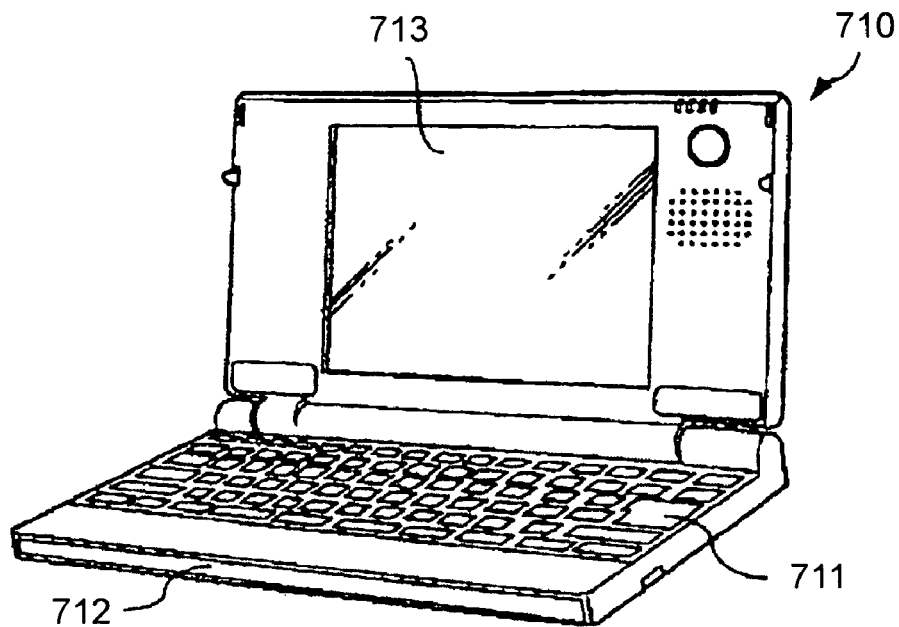
FIGS. 9A and 9B illustrate examples of electronic apparatus to which the automatic image correction circuit according to an embodiment of the invention is applied.

FIG. 9A is a perspective view illustrating the configuration of a portable personal computer (i.e., a notebook computer) 710 to which the automatic image correction circuit 100 or 101 of the above-described embodiment of the invention is applied. The personal computer 710 includes a main unit 712 provided with a keyboard 711 and a display unit 713 using the liquid crystal panel according to an embodiment of the invention.

Figure 9B:
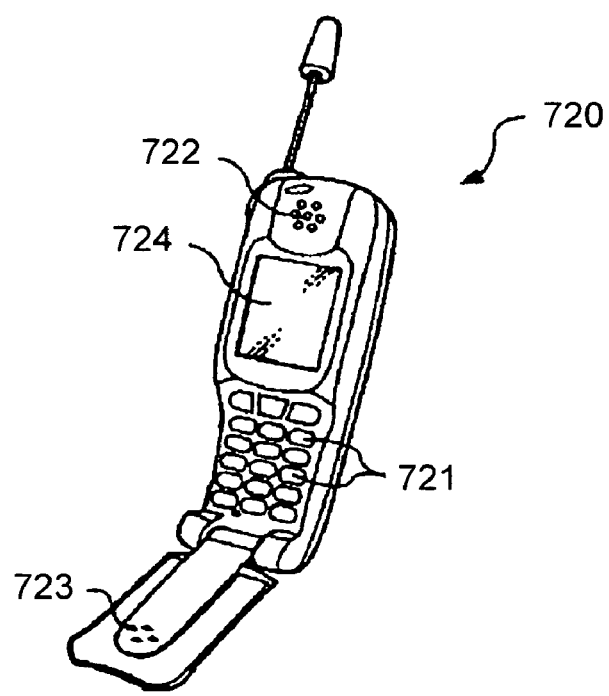

FIG. 9B is a perspective view illustrating the configuration of a cellular telephone 720 to which the automatic image correction circuit 100 or 101 according to the above-described embodiment of the invention is applied. The cellular telephone 720 includes a plurality of operation buttons 721, an earpiece 722, a mouthpiece 723, and a display unit 724 using a liquid crystal display.

Electronic apparatus to which the automatic image correction circuit 100 or 101 according to the above-described embodiment of the invention can be applied includes other types of devices, such as liquid crystal televisions, videophones, etc.

What is claimed is:

1. An automatic image correction circuit for automatically performing image correction on obtained image data, said circuit comprising:
   a storage unit for storing setting values used for the image correction, the storage unit including a first register and a second register;
   a controller for indicating a plurality of frame switching timings when one frame of the image data is switched to another frame of the image data; and
   an image correction unit for, at each said frame switching timing, reading the setting values stored in the second register of the storage unit and correcting a current frame using the setting values;
   wherein the controller is further configured for writing new setting values into the first register at a setting update timing different from the frame switching timings; and
   within a delay of less than one frame period of the image data from the setting update timing, writing the new setting values stored in the first register into the second register at the frame switching timing immediately after said setting update timing.

2. The automatic image correction circuit according to claim 1, further comprising: an image-correction-amount determining unit including a histogram generator, a statistical value calculator, and a correction amount calculator.

3. The automatic image correction circuit according to claim 2, wherein the histogram generator is adapted to generate histograms of luminance levels and saturation levels of the obtained image data, and total sums of luminance levels and saturation levels.

4. The automatic image correction circuit according to claim 2, wherein the statistical value calculator is adapted to calculate statistical values for the luminance and the saturation of the obtained image data based on the histograms and the total sums generated by the histogram generator.

5. The automatic image correction circuit according to claim 2, wherein the correction amount calculator is adapted to calculate a correction amount for the obtained image data based on the statistical values generated by the statistical value calculator.

6. The automatic image correction circuit according to claim 1, wherein the automatic image correction circuit is adapted to perform the image correction while maintaining the setting values used for the image correction for the current frame without being influenced by the setting update timing at which the setting values are changed in the first register.

7. An automatic image correction circuit for automatically performing image correction on obtained image data, said circuit comprising:
  a first register having
    a first input for receiving new setting values,
    a second input for receiving a clock signal, and
    a first output for outputting an output signal, wherein the first register is adapted to change the output signal to the received new setting values at a setting update timing defined by the clock signal;
  a second register having
    a third input coupled to the first output of the first register for receiving the output signal from the first register,
    a fourth input for receiving a plurality of frame switching pulses, and
    a second output for outputting the output signal of the first register at every one of said frame switching pulses; and
  an image correction unit coupled to the second output of the second register for reading
  the new setting values outputted by the second register and correcting a subsequent frame using the new setting values;
  wherein the second register is adapted to output the new setting values to the image correction unit at the frame switching pulse immediately after the setting update timing; and
  wherein a delay between the setting update timing and the frame switching pulse immediately thereafter is less than one frame period of the image data.

* * * * *